Figure 1:
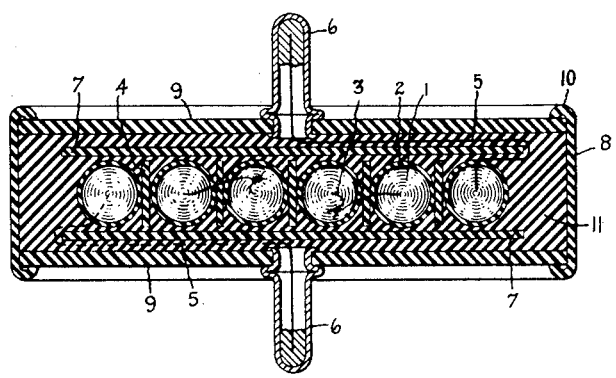

April 11, 1950  R. H. KIMBALL  2,503,912
ELECTRIC CAPACITOR
Filed Oct. 7, 1946

Inventor:
Robert H. Kimball,
by Ernest C. Britton
His Attorney.

Patented Apr. 11, 1950

2,503,912

UNITED STATES PATENT OFFICE 2,503,912

ELECTRIC CAPACITOR

Robert H. Kimball, Pittsfield, Mass., assignor to General Electric Company, a corporation of New York Application October 7, 1946, Serial No. 701,699

4 Claims. (Cl. 175—41)

My invention relates to electric capacitors and more particularly to an improved construction for high voltage capacitors.

In high voltage power supply circuits it has been the practice to use dry-type capacitors of wound construction in which strips of conducting foil and strips of dielectric therebetween have been wound into a roll and inserted into a cylindrical tube or case constructed of high dielectric strength material. The ends of the tube have been sealed off by circular disks or end pieces of the same material as the case. In the center of each end piece a metal prong has been mounted. The prong at one end of the tube has been connected electrically inside the tube to the foil or foils of one polarity and has served as one external terminal of the capacitor. The prong mounted in the center of the disk at the opposite end of the tube has been connected electrically to the foil or foils of opposite polarity and likewise has served as the other external terminal of the capacitor.

In many applications, it is imperative that such capacitors occupy the absolute minimum of space. In so far as the diameter is concerned, the wound construction is ideal since considerable effective plate surface is wound into a compact roll having a relatively small diameter. However, to prevent voltage creepage from the edge of a foil or electrode of a given polarity around the edge of the adjacent dielectric material to the next foil or electrode of opposite polarity, it has been necessary to employ a long creepage path which, in the case of the wound construction, is mostly in an axial direction. Since the length of this path is a function of the applied voltage in that it must be increased as the voltage is increased it necessarily follows that the axial dimension of the roll and tube case must be increased as the voltage is increased. Therefore, as to the length or axial dimension, those familiar with the art appreciate that any decrease in axial dimension has been limited by the voltage to be applied to the end terminals. From the point of view of compactness, such limitation is especially undesirable in the many cases where it is desired to connect several of these units in series, end to end.

It is therefore an object of my invention to provide an improved capacitor casing construction so as to obtain minimum axial distance with maximum radial creepage distance between external terminals.

In accordance with my invention I divide the capacitor element into several series sub-sections, to obtain maximum dielectric and creepage breakdown voltages, thereafter arranging and casing them in such manner that maximum radial creepage distance between external terminals is obtained while minimum axial distance is occupied by the unit.

Figure 2:
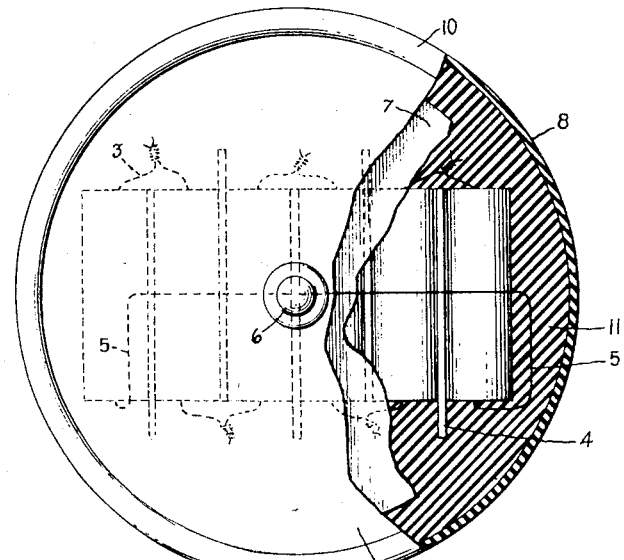
Figure 3:
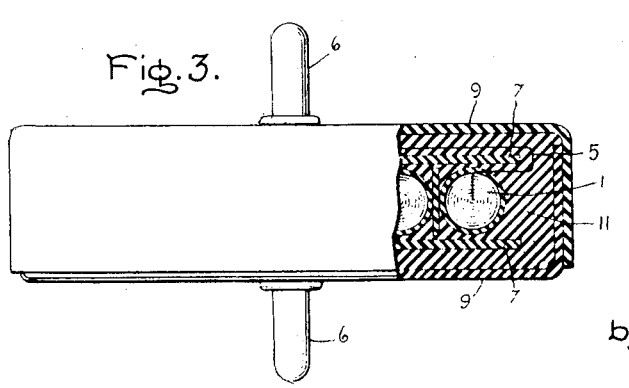
Figure 4:
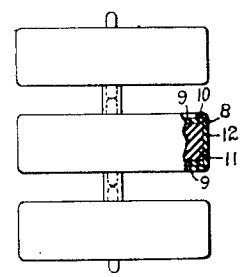

My invention will be better understood from the following description when taken in connection with the accompanying drawing and the scope of my invention will be pointed out in the appended claims. In the drawing Fig. 1 is a section taken through the center of a capacitor unit embodying my invention; Fig. 2 is a plan view with casing partly broken away to show the arrangement of sub-sections therein; Fig. 3 is an edge elevation view of a modified type of casing partly broken away better to illustrate the modification thereof, and Fig. 4 shows three capacitor units connected electrically together in series better to illustrate the purpose of another modification in type of casing.

Referring to Fig. 1 of the drawing, I have illustrated a capacitor unit divided into six sub-sections 1, all similar and each one of which is comprised of strips of conducting electrode or foil and strips of dielectric therebetween all wound into a compact roll and inserted into a cylinder of insulating material 2. The sub-sections are electrically connected in series by conducting wires 3, and arranged side by side with their ends in a straight line and with their axes in the same plane. Insulating barriers 4 are placed between adjacent sub-sections to increase the creepage path between the foils which are both at the same end of adjacent sub-sections and also at different potentials.

Each sub-section at the end of this group is connected electrically by a lead wire 5 to one of two terminals 6 to which the wire is preferably soldered for better electric contact. Circular insulating disks 7 separate the group of sub-sections from the terminals 6, thereby increasing the creepage path from any one of the sub-sections to the terminals and at the same time permitting the distance between terminals in an axial direction to be closer than would otherwise be possible.

A cylindrical tube or case 8, constructed of high dielectric strength material is selected with such diameter that the aligned sub-sections can be compactly accommodated therein when arranged with their long or axial dimension at right angles to the axis of the cylindrical case and with a length in an axial direction which is slightly in excess of the diameter of a sub-section plus the thicknesses of the two circular disks 7 plus the thicknesses of the two end pieces 9.

Each terminal 6 is spun over in the center of a circular disk or end piece 9 constructed of the same or similar type of insulating material as the tube 8. The end pieces or disks 9 having a diameter slightly less than the inside diameter of the tube are inserted into each end of the tube and the ends of the tube are spun or rolled over as indicated by the numeral 10 to complete the enclosure. All space between the end pieces is completely filled with wax, resin, or low loss insulating material 11, better to isolate foils and wire of a given polarity from foils and wire of opposite polarity, and both foils and wire from the case. This filling serves also to protect the capacitor dielectric against moisture and to transmit heat from the sub-sections to case 8 for radiation.

It is to be observed that the employment of a cylindrical tube or case rather than a square or rectangular case results in an outside creepage path between terminals equal in all directions.

It is also to be observed that the total creepage path from one terminal out radially to the edge of the cylindrical case, around the periphery of the case, and back radially to the terminal of opposite polarity considerably exceeds the distance between terminals in an axial direction.

I have constructed a capacitor based on my invention having the same capacitance and voltage rating as one of the standard tubular construction in which the overall diameter of the tube or case of my improved construction is 2 5/16" versus 1 3/8" for the standard while the overall length of the tube or case in an axial direction is only 1 3/8" versus 4" for the standard. Although the diameter of my improved construction is in excess of the diameter of the standard tube this dimension is less objectionable than a large axial dimension and it is to be noted that the total length of creepage path of my improved construction, that is 1 5/32" plus 1 3/8" plus 1 5/32" or 3 1/8", is nevertheless less than that required for the standard which is 1 3/8" plus 4" axially plus 1 3/8" or 4 3/8". It does not follow, therefore, that the reduction in axial dimension which I have been able to obtain by my invention necessitates an increase in diameter to the extent that the creepage path will be equal to that of the standard construction. In fact, recent tests indicate that the 2 5/16" diameter may be still considerably reduced for the same voltage rating and capacitance without increasing the axial distance of 1 3/8" between terminals.

Although I have illustrated and described capacitor sub-sections as of the rolled type, I do not limit myself to this particular construction since it will be obvious to those skilled in the art that any other well known construction may be used.

Therefore, in accordance with my invention, capacitors for the higher voltage ratings may be enclosed in a casing so shaped and dimensioned that the entire unit will be compact, occupy a minimum volume and with the distance between terminals in an axial direction considerably reduced below that necessary in the standard tubular construction for the same terminal voltage.

Figure 3 shows a capacitor unit embodying the primary features of my invention but with a modified casing consisting of only two parts instead of three. In lieu of a separate cylindrical tube, the portion of the case in an axial direction is integral with each end piece 9 with the outside diameter of one part slightly less than the inside diameter of the other part so that it can be telescoped within the latter part to complete the enclosure.

Figure 4 showing three capacitor units connected electrically in series illustrates the close proximity of a relatively large cylindrical casing surface on one capacitor unit to a comparable casing surface on the adjacent capacitor unit.

This large surface may be utilized as an electrostatic shield by covering the exterior of case 8 with a conducting material. Those skilled in the art will realize the effect of said shields to equalize the stray electrostatic field on the whole assembly in that they cause a more uniform distribution of the applied potential across the individual capacitors. This conducting covering will also shield points of high electrical stress inside of the casing. Thus in Figure 4 is illustrated another modification of my invention in which the outside of the insulating cylindrical tube of the casing is covered with a conducting material 12. By employment of such modification the semi-conducting or conducting cylindrical casing serves as grading rings to eliminate points of high voltage stress and makes a more uniform field, thereby lessening corona and its effects.

While I have in accordance with the patent statutes, shown and described a particular embodiment of my invention and modifications thereof, other changes and modifications will be obvious to those skilled in the art and I, therefore aim in the appended claims to cover all such changes and modifications as fall within the true spirit and scope of my invention.

What I claim as new and desire to secure by Letters Patent of the United States is:

1. An electric capacitor comprising a group of serially connected capacitor sub-section units arranged side by side with their symmetrical axes parallel, a cylindrical casing of insulating material enclosing said units, the axis of said casing being at right angles to the axes of said sub-section units, a pair of circular insulating disks having a diameter slightly greater than the overall length of said units, said disks being respectively placed adjacent to opposite sides of the group of units and parallel to the ends of the casing, terminals respectively secured to the central portions of the opposite ends of said casing and electrically connected respectively to different end units, the inside diameter of said casing being slightly greater than the diameter of the circular insulating disks and the length of said casing in an axial direction being slightly greater than the axial distance separating said disks.

2. In an electric capacitor, a group of serially connected capacitor sub-section units arranged side by side with their symmetrical axes parallel, a cylindrical casing of insulating material enclosing said units and comprised of two circular disks held respectively within opposite ends of a cylindrical tube by the ends thereof being spun over to retain the end pieces within the tube, the axis of said casing being at right angles to the axes of said sub-section units, a pair of circular insulating disks having a diameter slightly greater than the overall length of said units, said disks being respectively placed adjacent to opposite sides of the group of said units and parallel to the ends of the casing, terminals respectively secured to the central portions of the opposite ends of said casing and electrically connected respectively to different end units, the inside diameter of said casing being slightly greater than the diameter of the circular insulating disks and the length of said casing in an axial direction being slightly greater than the axial distance separating said disks.

3. In an electric capacitor, a plurality of serially connected capacitor sub-section units arranged side by side with their symmetrical axes parallel, a cylindrical casing of insulating material enclosing said units and comprised of two cylinders one end of each being closed to form an end of the casing and the inside diameter of one cylinder being slightly greater than the outside diameter of the other with the open end of the latter telescoped within the open end of the former, the axis of said casing being at right angles to the axes of said units, a pair of circular insulating disks having a diameter slightly greater than the overall length of said units, said disks being respectively placed adjacent to opposite sides of the group of said units and parallel to the ends of the casing, terminals respectively secured to the central portions of the closed ends of said cylinders and electrically connected respectively to different end units, the inside diameter of said casing being slightly greater than the diameter of the circular insulating disks and the length of said casing in an axial direction being slightly greater than the axial distance separating said disks.

4. In an electric capacitor, a cylindrical casing of insulating material having a length in an axial direction considerably less than the diameter and enclosing a group of serially connected similar capacitor sub-section units of the rolled type arranged side by side with their ends in a straight line and their axes in the same plane, the axis of said casing being at right angles to the axes of said aligned units, a pair of circular insulating disks having a diameter slightly greater than the overall length of said aligned units, said disks being respectively placed adjacent to opposite sides of the group of aligned units and parallel to the ends of the casing, terminals respectively secured to the central portions of the opposite ends of said casing and electrically connected respectively to different end units, the diameter of said casing being slightly greater than the overall length of said aligned units and the length of said casing in an axial direction being slightly greater than the diameter of a sub-section unit.

ROBERT H. KIMBALL.

REFERENCES CITED

The following references are of record in the file of this patent:

UNITED STATES PATENTS

| Number | Name | Date |
| --- | --- | --- |
| 1,661,823 | Hawley | Mar. 6, 1928 |
| 1,696,895 | Pickard | Dec. 25, 1928 |
| 2,397,551 | Leno | Apr. 2, 1946 |

FOREIGN PATENTS

| Number | Country | Date |
| --- | --- | --- |
| 463,679 | Great Britain | Apr. 5, 1937 |
| 754,597 | France | Aug. 28, 1933 |